E. H. BIEL.
COMBINED HOOK AND FORK.
APPLICATION FILED AUG. 21, 1912.
1,055,700.
Patented Mar. 11, 1913.
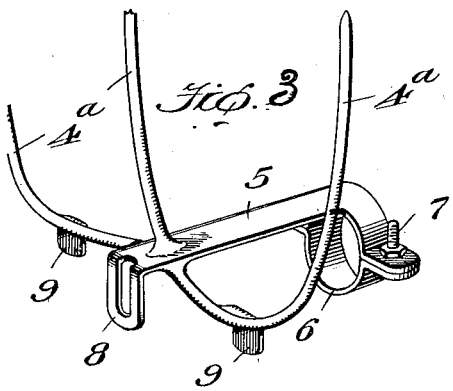
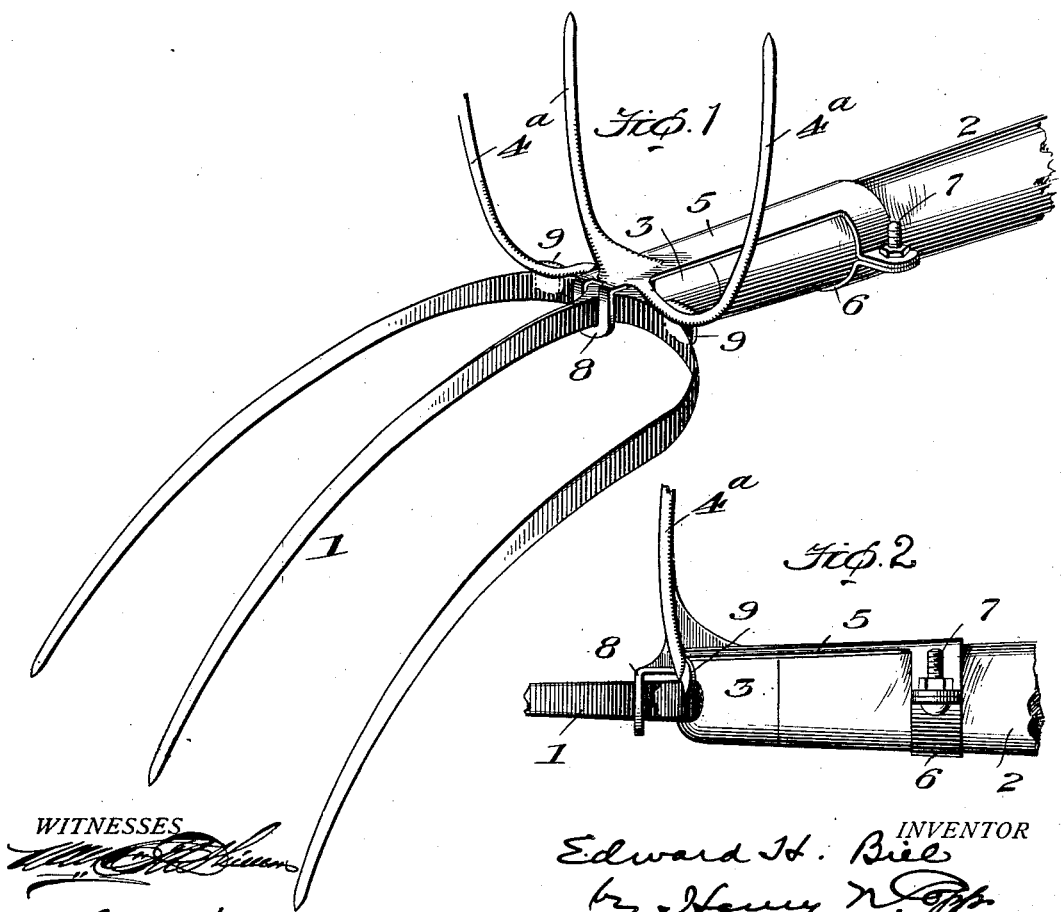

UNITED STATES PATENT OFFICE.

EDWARD H. BIEL, OF RANDOLPH, WISCONSIN.

COMBINED HOOK AND FORK.

1,055,700.  Specification of Letters Patent.  Patented Mar. 11, 1913.

Application filed August 21, 1912. Serial No. 716,295.

*To all whom it may concern:*

Be it known that I, EDWARD H. BIEL, a citizen of the United States, residing at Randolph, county of Dodge, and State of Wisconsin, have invented certain new and useful Improvements in Combined Hooks and Forks, of which the following is a specification.

This invention relates to combined hooks and forks.

My object is to provide a spreading pitch fork and hook in one implement constructed and arranged so that the fork may be used for spreading hay in a hay mow and the hook employed at any time to pull the hay toward the workman so that it may be handled with the fork.

In handling hay in a barn, the hay that drops tends to pile up and pack solid and is difficult to work with an ordinary pitch fork. The workman has to climb to the top of the pile, a distance of several feet, in order to properly do the work. My invention seeks to obviate this difficulty by the provision of a combined pitching fork and spreading hook, the fork being used in the usual manner and the hook employed to spread the mow and to open up the dropped hay so that it may be worked with the fork.

The invention is carried out by the provision of an improved separate fork attachment which may be applied to the handle or ferrule and to the pitching fork to convert an ordinary pitching fork into a combined fork and hook so that when the handle is turned one way, the pitching fork may be used, and when reversed, the hook may be used to pull the hay around in the mow to open it up on the floor of the barn.

In the accompanying drawings: Figure 1 is a perspective view of the invention; Fig. 2, a detail side elevation, parts being broken away; and Fig. 3, a detail perspective view of the hook.

An ordinary three-tined pitching fork is shown at 1 as suitably connected to any preferred handle 2, a ferrule 3 being usually employed. The tines 4ª of the hook are secured to a clamp 5 adapted to extend along the handle 2 and provided with a removable or movable part 6, whereby the hook-tines are clamped to the handle by suitable fasteners such as bolts 7. The device is provided with an apertured ear 8 receiving the central tines of the fork 1 and the tines 4ª have extensions or parts 9 bearing against the remaining tines of the fork 1. The hook is thus held against circular movement in relation to the handle 2 and against longitudinal movement in relation to the fork 1 and is secured against movement in any direction.

When the invention is carried out in the manner just described, it is in the nature of an attachment which can be applied to any pitching fork and does not, necessarily, have to accompany the pitching fork when the latter is originally manufactured.

Having thus described my invention, what I claim as new and desire to secure by Letters Patent, is:—

The combination with a pitching fork, of a detachable hook having an apertured ear engaging the center tine of the fork on one side of the head thereof and also having extensions engaging the opposite side of the head of the fork in such manner as to prevent movement of said hook, and a clamp connected to said hook and detachably connecting it to the handle of the fork.

In testimony whereof, I hereunto affix my signature in presence of two witnesses.

EDWARD H. BIEL.

Witnesses:
 E. F. CASEY,
 JOHN H. KOCH.